(12) United States Patent
Mehedy et al.

(10) Patent No.: US 10,915,221 B2
(45) Date of Patent: Feb. 9, 2021

(54) PREDICTIVE FACSIMILE CURSOR

(71) Applicant: International Business Machines Corporation, Armonk, NY (US)

(72) Inventors: Lenin Mehedy, Doncaster East (AU); Jorge Andres Moros Ortiz, Melbourne (AU); Adam H. E. Eberbach, Surrey Hills (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/053,880

(22) Filed: Aug. 3, 2018

(65) Prior Publication Data

US 2020/0042155 A1 Feb. 6, 2020

(51) Int. Cl.
*G06F 3/0481* (2013.01)
*G06F 3/0482* (2013.01)

(52) U.S. Cl.
CPC ........ *G06F 3/04812* (2013.01); *G06F 3/0482* (2013.01); *G06F 3/04817* (2013.01)

(58) Field of Classification Search
CPC ...... G06F 3/048; G06F 3/04812; G06N 7/005
See application file for complete search history.

(56) References Cited

U.S. PATENT DOCUMENTS

| | | | |
|---|---|---|---|
| 6,323,884 B1 * | 11/2001 | Bird .................... | G06F 3/04812 715/810 |
| 6,567,838 B1 | 5/2003 | Korenshtein | |
| 7,554,522 B2 | 6/2009 | Sinclair, II et al. | |
| 8,103,956 B2 | 1/2012 | Trujillo | |
| 8,736,431 B2 | 5/2014 | Jones et al. | |
| 9,262,070 B2 | 2/2016 | Wolfram et al. | |
| 9,477,457 B1 | 10/2016 | Langton et al. | |
| 9,785,619 B1 * | 10/2017 | Hill ..................... | G06F 16/9574 |

(Continued)

FOREIGN PATENT DOCUMENTS

| | | |
|---|---|---|
| JP | 2002351600 A | 12/2002 |
| JP | 3895406 B2 | 3/2007 |

OTHER PUBLICATIONS

Virtue, Mark. "Use Those Extra Mouse Buttons to Increase Efficiency." How, How-To Geek, Jul. 11, 2017, www.howtogeek.com/howto/14400/use-those-extra-mouse-buttons-to-increase-efficiency/. (Year: 2017).*

(Continued)

*Primary Examiner* — Jennifer N To
*Assistant Examiner* — Liang Y Li
(74) *Attorney, Agent, or Firm* — Michael A. Petrocelli

(57) ABSTRACT

Embodiments of the present invention provides methods, computer program products, and a system for determining a probable user selection on a user interface and generating a functional shadow cursor that is displayed on the user interface at a determined location of most probable user selection. Embodiments of the present invention can be used to access a user interface, generate a shadow cursor on the user interface based on a generated transition graph, and disabling the original cursor. In response to receiving user feedback, embodiments of the present invention can remove and disable the shadow cursor and return the original cursor as the sole functioning cursor. In response to receiving user feedback, embodiments of the present invention can shift the generated shadow cursor to a next probable selection.

14 Claims, 5 Drawing Sheets

(56) References Cited

U.S. PATENT DOCUMENTS

| | | | | |
|---|---|---|---|---|
| 10,083,108 | B1* | 9/2018 | Karole | G06F 16/951 |
| 2007/0067744 | A1 | 3/2007 | Lane et al. | |
| 2008/0010534 | A1* | 1/2008 | Athale | G06F 9/451 |
| | | | | 714/38.14 |
| 2008/0306824 | A1* | 12/2008 | Parkinson | G06Q 30/02 |
| | | | | 705/14.73 |
| 2012/0323677 | A1 | 12/2012 | Bottou et al. | |
| 2013/0074013 | A1* | 3/2013 | Tapiola | G06F 3/04883 |
| | | | | 715/859 |
| 2015/0142504 | A1* | 5/2015 | Kozloski | G06Q 10/0633 |
| | | | | 705/7.26 |
| 2017/0039076 | A1* | 2/2017 | Kurabayashi | G06F 3/04883 |
| 2019/0286458 | A1* | 9/2019 | Koryakin | G06F 3/0481 |

OTHER PUBLICATIONS

A. Merron, A. Nagarajan, and Q. Xie, "Automating Regression Testing for Evolving GUI Software," J. Software Maintenance and Evolution: Research and Practice, vol. 17, No. 1, pp. 27-64, 2005. (Year: 2005).*

Smith, Aaron, "Older Adults and Technology Use", Pew Research Center, Apr. 3, 2014, 4 pages, <http://www.pewinternet.org/2014/04/03/older-adults-and-technology-use/>.

"Nearly 1 in 5 People Have a Disability in the U.S., Census Bureau Reports", United States Census Bureau, For Immediate Release: Wednesday, Jul. 25, 2012, Last Revised: May 19, 2016, 3 pages, <https://www.census.gov/newsroom/releases/archives/miscellaneous/cb12-134.html>.

* cited by examiner

PREDICTIVE FACSIMILE CURSOR

BACKGROUND

The present invention relates generally to the field of computer interfacing, and more particularly to the display of peripheral devices on an interface.

A computer interface is a shared boundary between two or more separate components of a computer system that exchanges information. The exchange of information can be between a user, software, hardware, peripheral devices, and any combination thereof.

A peripheral device is a device used by a user to input and output information to/from a computer, which can include devices such as a mouse, keyboard, game controllers, computer monitors, projectors, printers, etc. In particular to a user-mouse-monitor interface, software support for a mouse and a monitor allow for a user to physically interact with a computer through the use of fine motor skills of the mouse. For example, planar motion of the mouse, clicking of a set of buttons, and rolling of a scroll wheel each provide a set of instructions to the computer to display on the monitor an interactive icon (i.e., a "mouse cursor", or simply "cursor") that reacts to the user actions and allow for a user to execute decisions on the computer.

SUMMARY

Embodiments of the present invention disclose a method, a computer program product, and a system for determining a probable user selection on a user interface and generating a functional shadow cursor that is displayed on the user interface at a determined location of most probable user selection. In one embodiment of the present invention, a method is provided comprising: accessing a user interface display that includes one or more selection areas and an original cursor placed over one selection area of the plurality of selection areas; generating a shadow cursor for the user interface that displays over a most probable selection area based on a generated transition graph specific to the user; and disabling the original cursor based on the generated shadow cursor and placement of the generated shadow cursor at the most probable selection area.

DETAILED DESCRIPTION

Embodiments of the present invention recognize that some users may lack the fine motor skills to properly control a cursor using a mouse. For example, oftentimes a user is required to navigate through a multi-page or multi-step process on a webpage or application such as a sign-up process or filling in an online form. In such multiple step processes, users need to select various inputs from a select box or radio buttons on the screen.

However, typically the mouse cursor remains at a previous click location for a newly loaded user interface window, which may not be located close to the next probable action of a user. This static behavior of the cursor requires the user to move the physical mouse in order to move the cursor to the desired location for user selection for each newly loaded user interface window. For users having weak motor skills, such as an elderly person, a child, or a person with special needs, the static behavior of the cursor can be frustrating feature where moving the physical mouse repeatedly becomes a time consuming and challenging endeavor. Additionally, operating software for users with movement disabilities may hinder the operational capability of the user. This problem can arise with a user interacting with a personal computer, tablet devices, virtual and/or augmented reality environments where the user is required to move around, use gestural input, or voice input.

Embodiments of the present invention provide a technical improvement for determining a probable user selection and generating a functional shadow cursor (marker) that is displayed over the user interface at a location that is the most probable user selection. As described in greater detail later in the specification, embodiments of the present invention provide the capability of generating a shadow cursor at a probable user selection based on a transition graph and on a history of user selected inputs. Embodiments of the present invention provide the capability of a generating a shadow cursor that allows a user to operate the shadow cursor as a secondary cursor. In other words, the shadow cursor functions in an active state such that any movement of the mouse by a user correspondingly moves the shadow cursor at a location on a display interface, thus allowing the user to select interactive graphical icons and/or move the mouse slightly to the desired location instead of moving the physical mouse considerably. Embodiments of the present invention provide the capability of allowing the user to cancel the shadow cursor by using a gesture (e.g., shake the mouse slightly) that instructs the computer system to remove the shadow cursor from the interactive display and return to normal use of the original cursor. Implementation of embodiments of the invention may take a variety of forms, and exemplary implementation details are discussed subsequently with reference to the Figures.

Figure 1:
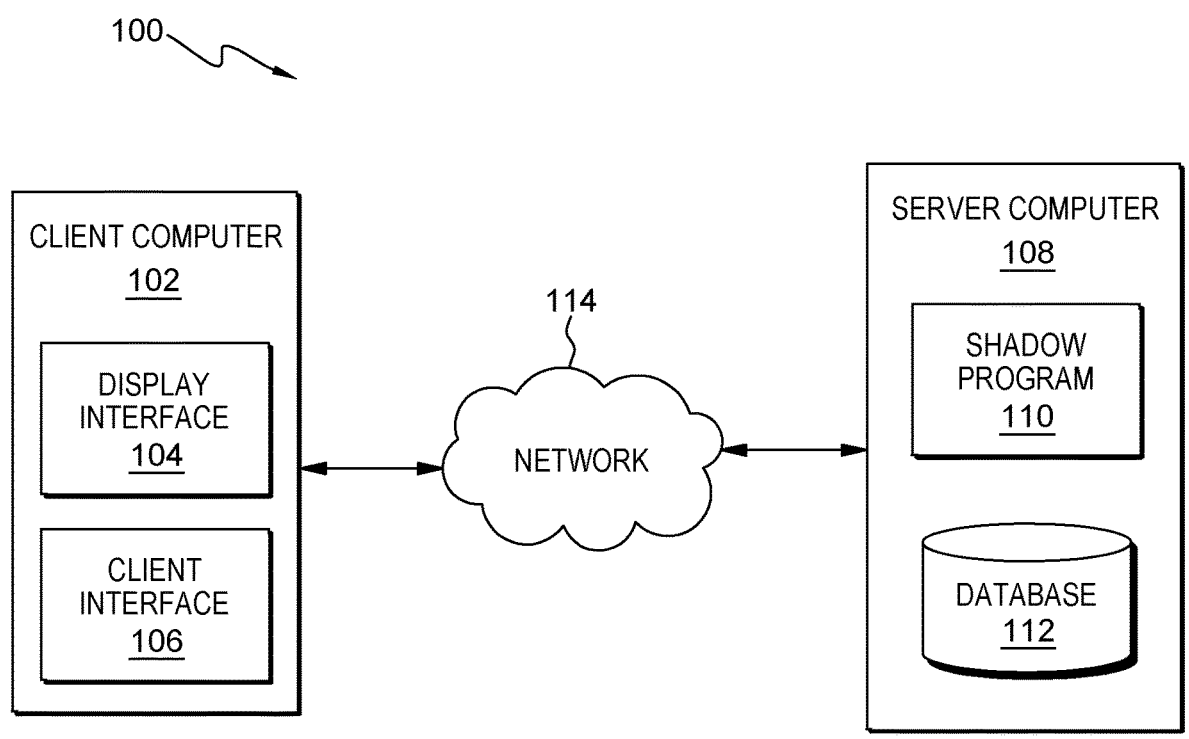
FIG. 1 is a functional block diagram illustrating a shadow cursor environment, in accordance with an embodiment of the present invention.

FIG. 1 is a functional block diagram illustrating a shadow cursor environment, generally designated 100, in accordance with one embodiment of the present invention. FIG.

1 provides only an illustration of one implementation and does not imply any limitations with regard to the environments in which different embodiments may be implemented. Many modifications to the depicted environment may be made by those skilled in the art without departing from the scope of the invention as recited by the claims.

Shadow cursor environment 100 includes client computer 102 and server computer 108, all interconnected over network 114. Client computer 102 and server computer 108 can be a standalone computing device, a management server, a webserver, a mobile computing device, or any other electronic device or computing system capable of receiving, sending, and processing data. In other embodiments, client computer 102 and server computer 108 can represent a server computing system utilizing multiple computers as a server system, such as in a cloud computing environment. In another embodiment, client computer 102 and server computer 108 can be a laptop computer, a tablet computer, a netbook computer, a personal computer (PC), a desktop computer, a personal digital assistant (PDA), a smart phone, or any programmable electronic device capable of communicating with various components and other computing devices (not shown) within shadow cursor environment 100. In another embodiment, client computer 102 and server computer 108 each represent a computing system utilizing clustered computers and components (e.g., database server computers, application server computers, etc.) that act as a single pool of seamless resources when accessed within shadow cursor environment 100. In some embodiments, client computer 102 and server computer 108 are a single device. Client computer 102 and server computer 108 may include internal and external hardware components capable of executing machine-readable program instructions, as depicted and described in further detail with respect to FIG. 5.

Server computer 108 includes shadow program 110 and database 112. In general, shadow program 110 accesses a user interface display to determine one or more selection areas and a location of an original cursor placed over one selection area of the plurality of selection areas. Shadow program 110 generates a transition graph based on inputs from a user or a set of users. Shadow program 110 then generates a shadow cursor based on the generated transition graph. Shadow program 110 is a program capable of receiving a user feedback based on user response of the generated shadow cursor. Lastly, shadow program 110 is a program capable of receiving feedback from a user such as a gesture and/or a physical cue made by a user that instructs shadow program 110 to remove the shadow cursor from the display screen, which allows the user to operate the original cursor for normal use. Shadow program 110 is depicted and described in further detail with respect to FIG. 2.

As used herein, a transition graph is a mapping of nodes and pathways respectively representing a set of possible states and a set of transition pathways between states of an application in response to a user input. Shadow program 110 generates and uses transition graphs to determine the most probable transitions from inputs to the next set of inputs on subsequent interactive graphical displays such as a computer application, web portal, or any program that utilizes a set of interactive graphical icons. As used herein, a computer application, web portal, or any computer program that can be described by a transition graph are commonly referred to as an "application". As used herein, a "state" of an application is any possible stable condition of an application that is awaiting user input. As used herein, a "transition arc" is an abstract link between two states (or in some instances, a single state that links to itself) that directs a first state of an application to a second state of an application. For example, when a user selects a graphical icon that represents a program instruction input, that icon can transmit a set of instructions to close a word processor (e.g. "X" located typically at the top right corner of a GUI of the word processor). In response to the user selection, the user is prompted with a display window asking: "Want to save your changes to document?" as well as providing three interactive graphical icons labeled "Save", "Don't Save", and "Cancel". In this example, a first state is the word processor idling waiting for user input. When the user selects the input that closes the word processor, this transition can be described as a transition arc in response to the selection of "X" that leads to a second state, wherein the second state is the window prompt stating "Want to save your changes to document?" and the respective displayed interactive icons "Save", "Don't Save", and "Cancel". In continuing the previous example, a user input selection of one of the three interactive icons subsequently lead to another state of the application that is linked by another respective transition arc (e.g., selecting "Don't Save" leads to a state of the application that does not save the document and is no longer displayed on the GUI nor running in the system background, and the transition arc is what abstractly connects the selection of "Don't Save" to the cessation of the application state).

As used herein, a physical cue can be any behavior, movement, gesture, or reaction made by a user that can be detected by shadow program 110 via client interface 106. For example, a user shakes or jiggles a mouse serving as client interface 106 for client computer 102. Shadow program 110 can detect that the mouse is shaken or jiggled. In another example, a user can make a facial expression in reaction to a generated shadow cursor (e.g., look of displeasure, grimace, or pursed lips made by the user). Shadow program 110 can detect the facial expression via a digital camera that serves as client interface 106. In yet another example, a user dissatisfied with a first location of a generated shadow cursor instead looks at a second location for a predetermined amount of time. Shadow program 110 can detect using a digital camera serving as client interface 106 that a user is looking at the second location for a predetermined amount of time via eye tracking methods. In some embodiments, shadow program 110 can detect gestures and/or physical cues that are predetermined for detection. For example, shadow program 110 is instructed to continuously monitor for a gesture made by a user, wherein the gesture consists of shaking or jiggling the mouse. In other embodiments, shadow program 110 can use machine learning techniques to determine gestures and/or physical cues that shadow program 110 determines are correlated with user dissatisfaction of a generated shadow cursor. For example, shadow program 110 continuously monitors a digital microphone serving as client interface 106 while a user interface with client computer 102. Shadow program 110 determines that a user has a behavioral pattern that, when shadow program 110 generates a shadow cursor at a first location, the user, in response to the generated shadow cursor, moves the shadow cursor to a second location while simultaneously saying "no". Shadow program 110 determines that the detected audible "no" made by the user correlates to user dissatisfaction of the first location of the generated shadow cursor.

As used herein, "cursor graphical icon", "cursor icon", and "mouse cursor" are commonly referred to as "cursor". Furthermore, a cursor is differentiated further as a "shadow cursor" and an "original cursor", but the shadow cursor and the original cursor are mutually exclusive cursors. As used herein, a shadow cursor is an interactive graphical icon overlaid on a display screen of an electronic device that serves as a facsimile of an original cursor operated by a user via a mouse or any interface device that a user operates to provide input selections on an electronic device. Furthermore, a shadow cursor is a cursor that is generated at the location of most probable selection on display interface 104. As used herein, an original cursor designates a cursor icon not originally generated by shadow program 110 that is projected by client computer 102 onto display interface 104. In some instances, a shadow cursor becomes an original cursor in the event shadow program 110 generates a shadow cursor while also disabling and removing a first original cursor from display interface 104, thus making the generated shadow cursor a second original cursor and only cursor displayed on display interface 104.

Database 112 is a repository for data accessible by shadow program 110. Database 112 can be implemented with any type of storage device capable of storing data and configuration files that can be accessed and utilized by server computer 108, such as a database server, a hard disk drive, or a flash memory. Database 112 stores generated transition graphs associated with an application utilized by a user. In one embodiment, the generated transitions graphs are based on inputs of a user. For example, shadow program 110 can generate a transition graph based on the collected inputs and/or selections made by a single user so that the transition graph is based upon the selection habits of the single user. In another embodiment, the generated transition graphs are based on inputs of a set of users. For example, shadow program 110 can generate a transition graph based on the collected inputs and/or selections made by a collection of users so that the transition graph reflects the statistical selection habits of an average user. In another embodiment, shadow program 110 can generate a transition graph based on machine learning techniques by continuously collecting inputs and/or selections made by a collection of users and/or a single user, and generating a transition graph based on the continuously collected inputs and/or selections. In another embodiment, application developers and/or domain experts can provide a transition graph by uploading a predetermined transition graph to database 112 for utilization by shadow program 110.

Client computer 102 includes display interface 104 and client interface 106. Display interface 104 is a computer output surface and projecting mechanism that shows text and graphic images to the user using a cathode ray tube (CRT), liquid crystal display (LCD), light-emitting diode (LED), gas plasma, or other image projection technologies. As used herein, display interface 104 displays for a user a graphical user interface (GUI) containing, but not limited to, a set of interactive icons and/or items for selection that can be selected using a cursor. Display interface 104 can be implemented using a browser, web portal, or any program that transmits queries to, and receives results from, server computer 108. Client interface 106 is any device that, when a user interacts with the device, client interface 106 transmits a set of instructions to client computer 102 to point a graphical icon represented as a cursor to a location on display interface 104 and/or to select one or more actions to take from that position. For example, client interface 106 can be a mouse device, a track ball device, or a trackpad or touchpad device.

Network 114 can be, for example, a telecommunications network, a local area network (LAN), a wide area network (WAN), such as the Internet, or a combination of the three, and can include wired, wireless, or fiber optic connections. Network 114 can include one or more wired and/or wireless networks that are capable of receiving and transmitting data, voice, and/or video signals, including multimedia signals that include voice, data, and video information. In general, network 114 can be any combination of connections and protocols that will support communications among client computer 102, server computer 108, and other computing devices (not shown) within shadow cursor environment 100.

For illustrative purposes, the following discussion is made with respect to shadow program 110 hosted on server computer 108, where a user interacts with shadow program 110 via client interface 106 as part of client computer 102. However, it should be understood that client computer 102 and server computer 108 can be on a single device, a combination of devices, and/or on one or more other components of shadow cursor environment 100.

Figure 2:
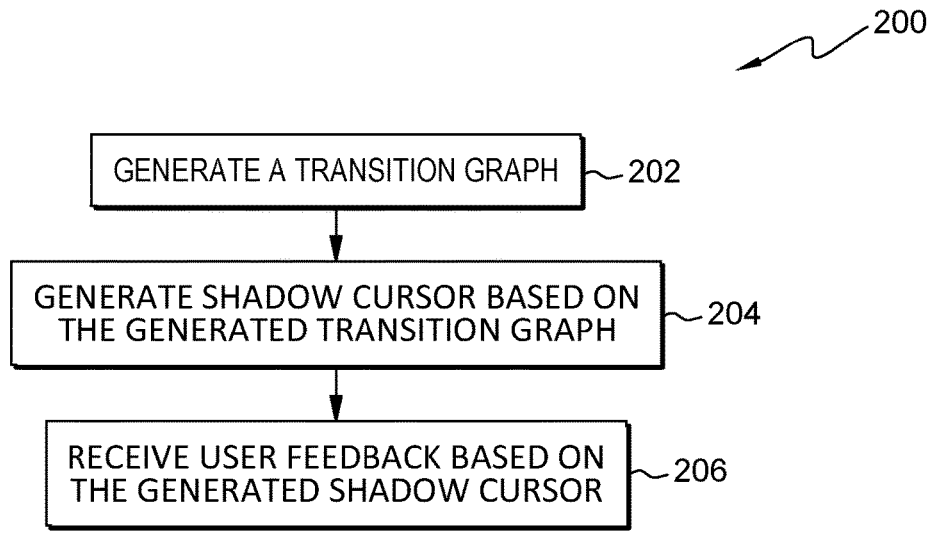
FIG. 2 is a flowchart depicting operational steps of a shadow program for predicting a local region of selection for a user, in accordance with an embodiment of the present invention.

FIG. 2 is a flowchart 200 depicting operational steps of a shadow program for predicting a local region of selection for a user, in accordance with an embodiment of the present invention.

In step 202, shadow program 110 generates a transition graph. In this embodiment, shadow program generates a transition graph of an application by determining all possible states of the application, mapping a set of transition arcs to a set of states among the all possible states of the application, collecting inputs made by one or more users for each state among the all possible states, and determining a set of probabilities corresponding to the set of transition arcs based on the collected inputs made by the user(s).

In this embodiment, shadow program 110 determines all possible states of an application by systematically selecting an input among a set of inputs for a first state of the application and determining a resulting state of the application as a result of the selected input among the set of inputs for the first state. In one instance, shadow program 110 determines the resulting state (in response to a first input) by checking whether the resulting state is the same as the first state (e.g., selecting a first input returns the same state of the application). In another instance, shadow program 110 checks whether a first resulting state (in response to a first input) is the same as a second resulting state in response to a selection of a second input (e.g., an application has three states: A, B, and C. While in state A, a user selects option 1, which results to state C. While in state B, a user selects option 2, which also results in state C. Shadow program 110 determines that the resulting state of the selection of option 1 while in state A and the selection of option 2 while in state B both result in state C). In another instance, shadow program 110 checks whether the resulting state is a unique state different from a first state and a resulting state in response to a second input (e.g., selecting a first input returns a state that is unlike the first state or a resulting state in response to a different input). For each determined unique state, shadow program 110 assigns an abstract label to the unique state (e.g., "state A", "state B", "state C", etc.). Shadow program 110 repeats this process of determining a resulting state for each input among the set of possible inputs for the first state. Once all resulting states have been determined in response to each corresponding input among the set of possible inputs for the first state, shadow program 110 repeats this process of determining a resulting state for each input among the set of possible inputs for a second state, a third state, etc., until all possible states of the application are determined.

For example, shadow program 110 determines an initial state O is in response to a selection that executes an application. Shadow program 110 further determines that initial state O has two possible inputs for selection: option A and option B. Shadow program 110 selects option A, determines that the resulting state in response to the selection of option A of the application is unlike initial state O, and subsequently designates the resulting state in response to the selection of option A as "state A". Shadow program 110 reverts to initial state O, selects option B, determines that the resulting state in response to the selection of option B of the application is unlike initial state O and state A, and subsequently designates the resulting state in response to the selection of option B as "state B". Shadow program 110 determines that there are no other possible inputs for selection for initial state O and subsequently begins determining states in response to selecting an input among a set of possible inputs for state A.

In continuing the above example, shadow program 110 determines state A has three possible inputs for selection: option C, option D, and option E. Shadow program 110 selects option C, determines that the resulting state in response to the selection of option C of the application is initial state O (i.e., the selection of option C reverts the application back to initial state O), and therefore does not assign the resulting state as a unique state. Shadow program 110 reverts to state A, selects option D, determines that the resulting state in response to the selection of option D of the application is state B, and therefore does not assign the resulting state as a unique state. Shadow program 110 reverts to state A, selects option E, determines that the resulting state ends the application (which shadow program 110 determines that this resulting state is unlike any previously determined state), and subsequently designates the resulting state in response to the selection of option E as "state E". Having selected all possible inputs for state A, shadow program 110 reverts to state B, and determines that state B only has one input (option F) as the all possible set of inputs for state B. Shadow program 110 selects option F, determines that the selection ends the application, which shadow program 110 further determines is state E, and therefore does assign the resulting state as a unique state. As a result of the determination process of the above example, shadow program 110 has determined that the application has initial state O, state A, state B, and state E.

Shadow program 110 maps a set of transition arcs to a corresponding set of states among the all possible states of the application by assigning a link and a corresponding abstract label to the link between each state among the all possible states in response to the corresponding inputs that determined all possible states for the application. For example, in relation to the previous example of determining all possible states of an application, when shadow program 110 determines that state A is the result of selecting option A from initial state O, shadow program 110 maps a transition arc leading from initial state O to state A, and designates the transition arc as "option A". In another example, when shadow program 110 determines that state E is the result of selecting option E from state A, shadow program 110 maps a transition arc leading from state A to state E, and designates the transition arc as "option E". Furthermore, when shadow program 110 determines that state E is the result of selecting option F from state B, shadow program 110 maps a transition arc leading from state B to state E, and designates the transition arc as "option F".

Shadow program 110 collects inputs made by one or more users for each state among the all possible states by logging the number of selections made by the user(s) for each input among the set of possible inputs for each state of the application, and associating the logged number of selections for each input among the set of possible inputs to a corresponding transition arc associated with the input among the set of possible inputs. For example, shadow program 110 determines that for initial state O, one or more users selects option A for 75 instances and option B for 25 instances.

In some embodiments, shadow program 110 collects and stores inputs made by the one or more users over a configurable amount of time, wherein a configurable amount of time can be one month, six months, a year, or a permanent amount of time (i.e., logged selections do not expire and are permanently logged). In other embodiments, shadow program 110 collects and stores inputs made by the one or more users for a set period of time (e.g., only selections made within a year are logged, and any logged selections made greater than a year are discarded). In another embodiment, shadow program 110 collects and stores inputs made by the one or more users for a set amount of total selections for each state (e.g., a state can only log 100 instances of selecting an input among the set of possible inputs for the state: any new selection is logged, but the new selection subsequently overwrites the oldest logged selection for all logged selections for that state)

Shadow program 110 determines a set of probabilities corresponding to the set of transition arcs by summing together the collected number of instances of inputs selected by the one or more users for all possible inputs for a state, and dividing the collected number of instances for an associated transition arc by the summed collected number of instances of inputs for all possible inputs for a state. Shadow program 110 uses the resulting value (e.g., the result of the aforementioned summing and dividing steps) as a probability value for the associated transition arc with values ranging from zero to one. For example, shadow program 110 determines that for initial state O, one or more users selects option A for 75 instances and option B for 25 instances. Shadow program 110 determines a set of probabilities for the transitions arcs option A and option B by summing 75+25=100, finding that the probability for option A is 75/100=0.75, and the probability for option B is 25/100=0.25.

In another embodiment, shadow program 110 generates a transition graph by acquiring a stored transition graph stored on database 112, wherein the stored transition graph is a transition graph predetermined and stored by a third-party. For example, application developers or domain experts can provide a transition graph that is subsequently stored on database 112 that defines the most probable transitions from inputs to next set of inputs for the application or web pages being accessed by the user. In another embodiment, application developers or domain experts can provide a state diagram represented through JavaScript Object Notation (JSON) or Extensible Markup Language (XML) formatting to serve as a transition graph that is subsequently stored on database 112. In this embodiment, a predetermined state transition is already known to developers since, during requirement analysis of application development, developers create "state transition diagrams" to convey the motivating idea for the application. Developers then write the application based on the state transition diagrams to satisfy the transition requirements.

In another embodiment, shadow program 110 generates a transition graph by analyzing the application as a Bayesian network through machine learning methods, wherein a Bayesian network is a probabilistic graphical model (a type of statistical model) that represents a set of variables and their conditional dependences via a directed acyclic graph. Bayesian networks are composed of a set of interconnected nodes wherein each node among the set of interconnected nodes have an associated probability function that takes, as an input, a particular set of values for a set of parent variables associated with the node.

In step 204, shadow program 110 generates a shadow cursor based on the generated transition graph. In this embodiment, shadow program 110 generates a shadow cursor on the display interface based on the generated transition graph by determining a current state of the application based on user inputs and the generated transition graph, ranking probable selections based on the analyzed user input, tagging selections based on the ranked probable selections, and overlaying a shadow cursor on the most probable location based on the tagged selections as described in greater detail with regard to FIG. 3, flowchart 300.

In step 206, shadow program 110 receives user feedback based on the generated shadow cursor. In this embodiment, shadow program 110 receives user feedback based on the generated shadow cursor by continuously monitoring for a physical cue made by the user via client interface 106 (e.g., digital camera, keyboard, mouse, trackpad, etc.). In response to determining the user made a physical cue (or lack thereof), shadow program 110 can either remove and disable the shadow cursor from a display interface or shift the shadow cursor to a next probable selection.

In one embodiment, shadow program 110 receives user feedback by continuously monitoring for a mouse gesture made by the user, wherein the mouse gesture made by the user can be, but is not limited to, gentle oscillations (i.e., shakes) of the mouse on a planar surface supporting the mouse that correspondingly giggle the shadow cursor overlaid on the display screen. In response to detecting that the user has oscillated the mouse, shadow program 110 can remove and disable the shadow cursor from the display screen, subsequently returning the original cursor as a sole functioning cursor for interaction and selection of interactive graphical icons on the display screen for the user. For example, shadow program 110 overlays a shadow cursor on an interactive graphical icon on display interface 104. The user, wishing to restore functionality of the original cursor, gently shakes the mouse in a planar motion such that the gesture correspondingly shakes the shadow cursor on display interface 104. Shadow program 110 detects the mouse inputs in response to the gesture made by the user, and subsequently removes the shadow cursor from display interface 104.

In another embodiment, shadow program 110 can receive user feedback based on the generated shadow cursor by monitoring for an input from a device that can serve as client interface 106 (e.g., a keyboard, touch pad, touch screen), wherein a designated selection of an input on the device made by the user instructs shadow program 110 to remove and disable the shadow cursor from display interface 104, subsequently returning the original cursor as a sole functioning cursor for interaction and selection of interactive graphical icons on display interface 104 for the user. For example, shadow program 110 generates a shadow cursor on an interactive graphical icon on display interface 104. The user, wishing to restore functionality of the original cursor, presses "Esc" on a keyboard that serves as client interface 106, wherein shadow program 110 has programmed instructions to remove the shadow cursor in response to receiving a signal associated with the button "Esc". Shadow program 110 detects that "Esc" was pressed on the keyboard by the user, and subsequently removes the shadow cursor from display interface 104. In another example, after shadow program 110 generates a shadow cursor on display interface 104, a user, dissatisfied with the location of the generated shadow cursor, swipes a gesture on a trackpad with a finger of the user. In response to the detected swiped gesture on the trackpad, shadow program 110 removes and disables the shadow cursor from display interface 104.

In another embodiment, shadow program 110 can receive user feedback based on the generated shadow cursor by monitoring for an input from a device that can serve as client interface 106 (e.g., a keyboard, touch pad, touch screen), wherein a designated selection of an input on the device made by the user instructs shadow program 110 to shift the shadow cursor on display interface 104 to a next probable selection, wherein the next probable selection is a probable selection that is not the current probable selection, is a probable selection that is closest in numerical probability value to the current probable selection, and is a probable selection that has a numerical probability value that is less than or equal to the current probable selection.

For example, shadow program 110 determines that option A, option B, and option C have corresponding probabilities of selection 0.4, 0.4, 0.2. Shadow program 110 generates a shadow cursor at a location of an interactive graphical icon associated with a most probable selection among the set of possible selections. Shadow program determines that two probable selections among the set of possible selections are the most probable selections while having the same numerical value of probability (i.e., option A and option B have the same value of probability: 0.4). In response to this determination, shadow program 110 arbitrarily selects one of the two most probable selections by "flipping a coin", wherein flipping a coin includes correspondingly associating each of the two most probable selections to a zero and one, and wherein flipping the coin is dictated by a random number generator that is restricted to integer values of zero and one. Similarly, shadow program 110 can do this for n-number of most probable selections wherein the arbitrary selection is dictated by a random number generator that is restricted to n-number of integer values between zero and (n−1).

In continuing the above example, shadow program 110 associates option A with the integer value of zero, determines that a random number generator selected the integer value of zero, and subsequently generates a shadow cursor at the location of an interactive graphical icon that is associated with option A. However, the user disapproves of the location of the generated shadow cursor, and pushes "tab" on a keyboard serving as client interface 106, wherein "tab" is a designated button that instructs shadow program 110 to shift the shadow cursor to the location of an interactive graphical icon associated with a next more probable selection. Shadow program 110 receives the input signal associated with "tab", and subsequently shifts the shadow cursor to a location of an interactive graphical icon associated with option B since option B has the same value of probability as option A, is not the current selection of option A, and has a value of probability that is less than or equal to the current selection of option A. Furthermore, the user, dissatisfied with option B, pushes "tab" again on the keyboard. Shadow program 110 receives the input signal associated with "tab", and subsequently shifts the shadow cursor to a location of an interactive graphical icon associated with option C since option C is not the current probable selection of option B, and has a value of probability that is less than or equal to the current selection of option B. The user, realizing that option B was the appropriate desired selection, presses "tab" twice on the keyboard. Shadow program receives the input signal twice associated with "tab", determines that shadow cursor has cycled through the entire set of probable selections, and subsequently cycles through the entire set of probable selections again starting at the most probable selection (previously determined to be option A). Shadow program 110 shifts the shadow cursor to the location of the interactive graphical icon associated with option A in response to the first tab input, and then shifts the shadow cursor to the location of the interactive graphical icon associated with option B in response to the second tab input.

In yet another embodiment, shadow program 110 can receive user feedback based on the generated shadow cursor by monitoring for lack of an input made by a user after a predetermined amount of time. In this embodiment, in response to not receiving an input from a user via client interface 106 after a predetermined amount of time, shadow program 110 removes and disables the shadow cursor from display interface 104, subsequently returning the original cursor as a sole functioning cursor for interaction and selection of interactive graphical icons on display interface 104 for the user. For example, shadow program 110 generates a shadow cursor on display interface 104 for a user. Shadow program 110 detects that, after a predetermined amount of time of ten seconds, the user did not interact with any client interface 106 (i.e., the user did not move a mouse planarly to correspondingly move the shadow cursor on display interface 104, did not click/scroll an input button on the mouse, did not enter a keystroke or press a button on a keyboard, did not swipe or tap a finger of the user on a trackpad, etc.). In response to detecting that a user did not interact with client interface 106, shadow program 110 removes and disables the shadow cursor from display interface 104, and returns the original cursor as a functioning cursor for interaction and selection of interactive graphical icons.

In a further embodiment, shadow program 110 can receive user feedback based on the generated shadow cursor by monitoring for lack of an input made by a user for a particular device serving as client interface 106 after a predetermined amount of time. In this embodiment, in response to not receiving an input from a user after a predetermined amount of time via a particular device that serves as client interface 106, shadow program 110 removes and disables the shadow cursor from display interface 104, subsequently returning the original cursor as a sole functioning cursor for interaction and selection of interactive graphical icons on display interface 104 for the user. As used herein, a particular device is a device serving as client interface 106 that is predetermined to be a device that shadow program 110 monitors for feedback such that the feedback is the lack of an input made by a user on the particular device. For example, shadow program 110 generates a shadow cursor on display interface 104 for a user. Shadow program 110 detects that, after a predetermined amount of time of ten seconds, the user did not interact with a mouse that is predetermined to be a particular device that shadow program 110 is monitoring for user feedback. In response to detecting that a user did not interact with the mouse after ten seconds, shadow program 110 removes and disables the shadow cursor from display interface 104, and returns the original cursor as a functioning cursor for interaction and selection of interactive graphical icons.

In an even further embodiment, shadow program 110 can monitor for lack of an input made by a user for a set of particular devices serving as client interface 106 after a predetermined amount of time. In this embodiment, in response to not receiving an input from a user after a predetermined amount of time via a set of particular devices that serves as client interface 106, shadow program 110 removes and disables the shadow cursor from display interface 104, subsequently returning the original cursor as a sole functioning cursor for interaction and selection of interactive graphical icons on display interface 104 for the user. For example, shadow program 110 generates a shadow cursor on display interface 104 for a user. Shadow program 110 detects that, after a predetermined amount of time of ten seconds, the user did not interact with a mouse or a trackpad that is predetermined, in combination, to be a set of particular devices that shadow program 110 monitors for user feedback for lack of an input; however, the user interacts with a keyboard by pushing any combination of button inputs, and the keyboard is not included as the set of particular devices. In response to detecting that a user did not interact with the set of particular devices after ten seconds, shadow program 110 removes and disables the shadow cursor from display interface 104, and returns the original cursor as a functioning cursor for interaction and selection of interactive graphical icons.

Figure 3:
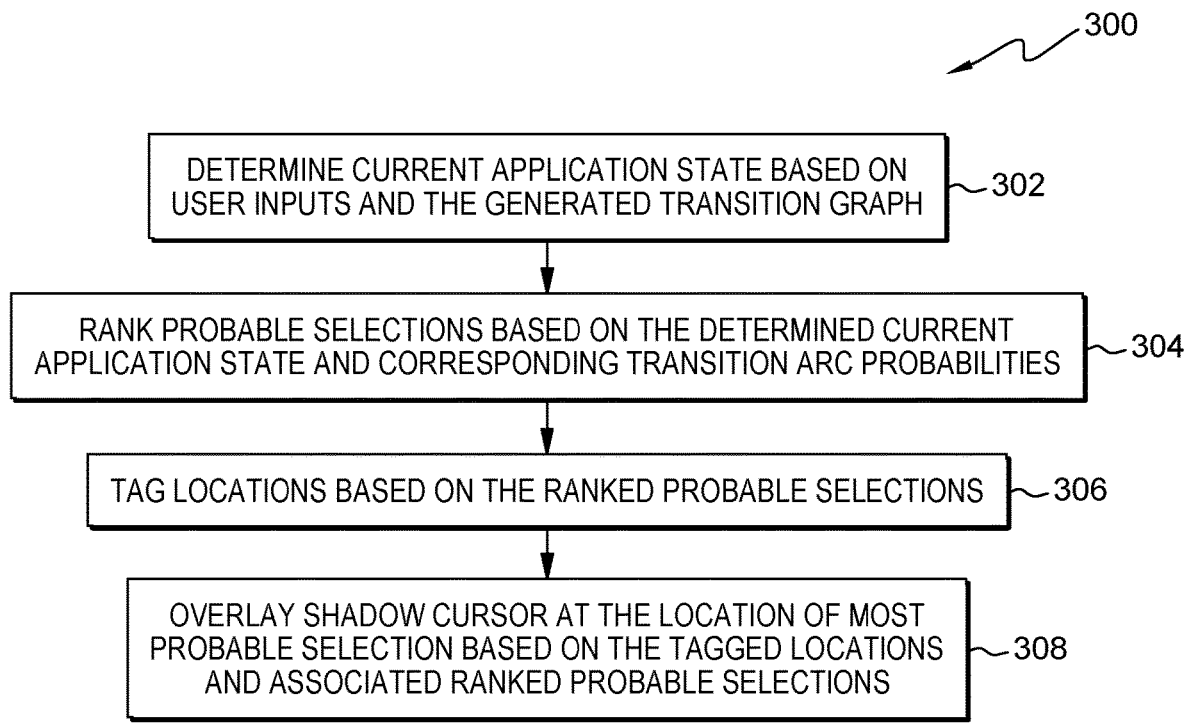
FIG. 3 is a flowchart depicting operational steps of generating a shadow cursor, in accordance with an embodiment of the present invention.

FIG. 3 is a flowchart 300 depicting operational steps of generating a shadow cursor, in accordance with an embodiment of the present invention.

In step 302, shadow program 110 determines a current state of the application based on user inputs and the generated transition graph. In this embodiment, shadow program 110 determines a current state of the application based on user inputs and the generated transition graph by tracing the user inputs along the generated transition graph to determine a resulting state of the application. For example, starting at an initial state O of an application, shadow program 110 collects from a user the input sequence of option A, then option D. Shadow program 110 traces the collected input selections from the user along the generated transition graph and determines that the resulting state of the application based on the sequence of inputs made by the user is state B (e.g., option A led to state A, and by selecting option D from state A, the application must currently be in state B based on the generated transition graph and the sequence of user inputs).

In another embodiment, shadow program 110 determines a current state of the application based on user inputs and the generated transition graph by matching respectively a most recent user selection and a current state of the application to a transition arc and a state among the determined transition graph. For example, at any instance of an application, a user selects option D, and in response to the selection of option D, the application enters a new state. Shadow program 110 matches the selection of option D to the transition arc associated with option D based on the generated transition graph, and also matches the new state to state B among the determined set of possible states of the application based on the generated transition graph. Shadow program 110 determines that the current state of the application must be at state B since the current state matches state B of the transition graph and that the selection of option D made by the user matches the transition arc of option D that led to state B of the transition graph.

In step 304, shadow program 110 ranks a set of probable selections based on the determined current application state and a corresponding set of transition arc probabilities. In this embodiment, shadow program 110 determines a set of probable selections based on the determined current application state. In this embodiment, shadow program 110 ranks a set of probable selections in order of highest probability of selection by acquiring from the generated transition graph a set of transition arc probabilities that correspond to the determined set of probable selections that a user may select for the corresponding current state of the application. In this embodiment, shadow program 110 uses a numerical ranking scale where greater values (e.g., 0.9) indicate higher probabilities than lesser values (e.g., 0.2). For example, shadow program 110 determines that a current state of the application is at state B as a result of a user selection of option D. Shadow program 110 acquires from the generated transition graph that state B has three probable input selections with corresponding probabilities of selection: option F (0.70), option G (0.20), and option H (0.1). Shadow program 110 ranks the probable input selections such that option F is determined to have the highest probable selection and is subsequently ranked 1, the option G is determined to be the next probable and is subsequently ranked 2, and option H is determined as being the least probable and is subsequently ranked 3. As used herein, all "possible" input selections for a state of an application may not necessarily be all "probable" input selections. For example, if option A has a probability of 0.75, option B has a probability of 0.25, and option C has a probability of 0 (historically never used), then options A, B, and C are possible, and only options A and B are probable.

In step 306, shadow program 110 tags a set of locations based on the set of ranked probable selections. In this embodiment, shadow program 110 tags a set of locations based on the set of ranked probable selections by identifying a set of locations on the application GUI associated with the locations of the corresponding set of interactive icons that are associated with the corresponding set of ranked probable selections, and then assigning a set of ranks corresponding to the set of ranked probable selections to the corresponding set of locations. As used herein, a location is a coordinate position that describes a position located on display interface 104. For example, shadow program 110 determines that for state B, the corresponding set of ranked probable selections are option F (0.70)—rank 1, option G (0.20)—rank 2, and option H (0.1)—rank 3. Shadow program 110 identifies that locations X, Y, Z on the application GUI correspond to the interactive icons of probable selections option F, G and H. Shadow program 110 assigns the corresponding ranks of the probable selections to the corresponding set of locations: Rank 1—Location X, Rank 2—Location Y, Rank 3—Location Z. As used herein, "tagging" is an operation performed on the backend of the application (i.e., locations of interactive icons are abstractly associated with ranks such that the ranks are not visible to the user through the application GUI).

In an alternate embodiment, after shadow program 110 determines a current application state based on a set of user inputs and the generated transition graph and determines a set of probable selections based on the determined current application state, shadow program 110 can tag locations on the user interface that correspond to each probable selection of the set of probable selections. Upon tagging locations on the user interface, shadow program 110 can then rank the set of probable selections in an order based on the determined current application state and corresponding transition arc probabilities of the generated transition graph.

In step 308, shadow program 110 overlays a shadow cursor at a location of most probable selection based on the tagged set of locations and associated set of ranked probable selections. In this embodiment, shadow program 110 overlays a shadow cursor at a location of most probable selection by overlaying a shadow cursor at the tagged location associated with the highest ranked (i.e., rank 1) probable selection, resulting in an overlaid shadow cursor on the interactive icon associated with the most probable selection. For example, in continuing from the example of step 306, shadow program 110 ranked option F as having the highest probability of selection among the set of probable selections, and subsequently identified location X that describes the location of the interactive icon associated with option F on the application GUI. Shadow program 110 then overlays a shadow cursor at location X.

In one embodiment, while the shadow program 110 overlays a shadow cursor at the location of most probable selection, shadow program 110 allows the shadow cursor to behave as a fully functional cursor much like the original cursor (e.g., the shadow cursor can move around the display interface 104 in response to planar motion of a mouse device connected as client interface 106, the shadow cursor can select interactive graphical icons displayed on display interface 104, etc.) In this embodiment, this feature allows a user to positionally adjust of the shadow cursor in the event that shadow program 110 overlays the shadow cursor at a location undesired by the user. For example, an application prompts a user to select between option A and option B on a displayed application GUI. Shadow program 110 determines that option A is the most probable selection, and subsequently overlays a shadow cursor at the location of the interactive graphical icon for selecting option A. However, the user wishes to select option B as the preferred selection. Shadow program 110 can receive mouse inputs as client interface 106 such that the user can positionally adjust the mouse, and shadow program 110, in response to the received mouse inputs, positionally adjusts the location of the shadow cursor corresponding to the motions of the mouse made by the user. The user moves the mouse in a planar motion that the user perceives would place the shadow cursor on the interactive graphical icon associated with option B, and in response to the received mouse inputs, shadow program 110 correspondingly moves the shadow cursor to the interactive graphical icon associated with option B. Furthermore, the user selects the interactive graphical icon associated with option B by clicking an input button on the mouse (commonly designated as a left button of a mouse), and in response to receiving the input button selection, shadow program 110 selects the interactive graphical icon associated with option B, subsequently executing option B of the application.

In some embodiments, while shadow program 110 has a shadow cursor overlaid on display interface 104, the original cursor has all functionality frozen (i.e., the original cursor is unresponsive to any received inputs from a mouse such as planar motion of the mouse or activated buttons of the mouse) until shadow program 110 receives an input from the user that indicates instructions to remove the shadow cursor from display interface 104.

In further embodiment, while shadow program 110 has a shadow cursor overlaid on display interface 104 and the original cursor has all functionality frozen, shadow program 110 transmits a set of instructions to client computer 102 to remove the original cursor from display interface 104. In this embodiment, shadow program 110 effectively makes the shadow cursor an original cursor.

In another embodiment, shadow program 110 overlays a shadow cursor at a location of most probable selection, wherein the icon representing the shadow cursor is an icon different from the original cursor such that the shadow cursor is visibly differentiable for a user from the original cursor. In this embodiment, the icon of the shadow cursor can be of different color, size, and/or shape. In some instances, the shadow cursor can be of size, color, shape, or any combination thereof that is easily distinguishable for users whom are visually impaired.

Figure 4A:
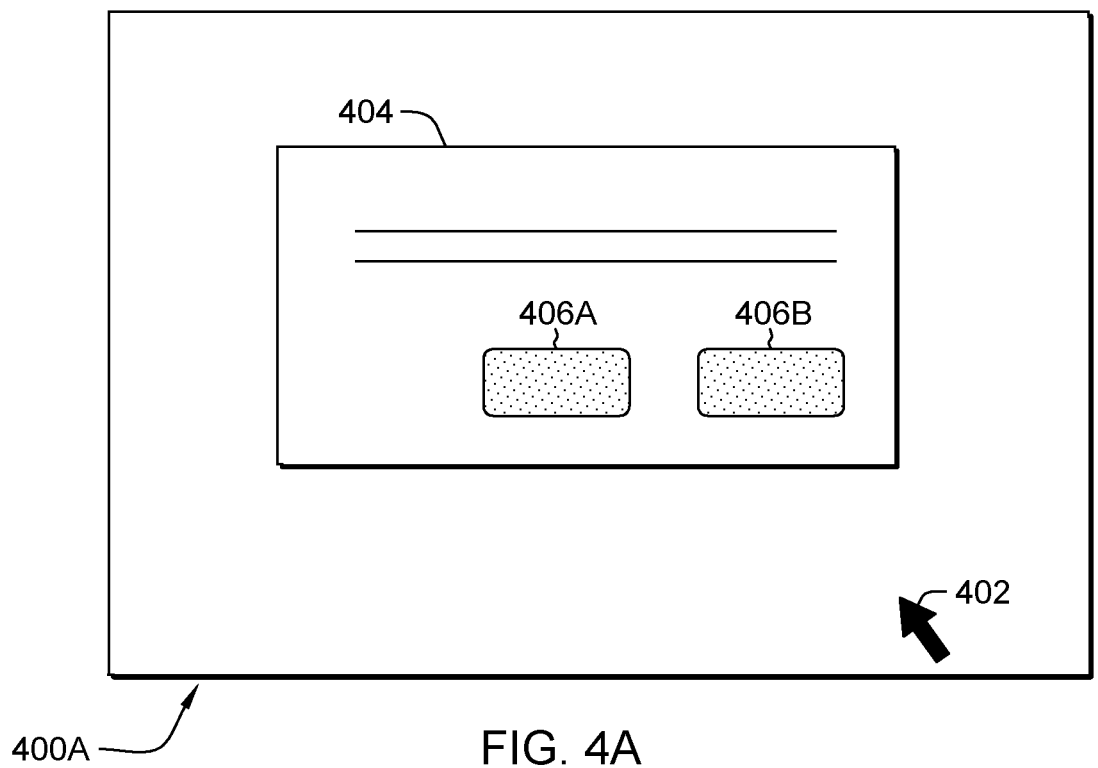
FIG. 4A is a screenshot example of an interactive graphical user interface displaying a user interface prior to generating a shadow cursor for a most probable action button, in accordance with an embodiment of the present invention.

FIG. 4A is a screenshot example of an interactive graphical user interface 400A displaying a user interface prior to generating a shadow cursor for a most probable action button, in accordance with an embodiment of the present invention.

In general, interactive graphical user interface 400A includes one or more interactive graphical icons, one or more GUI windows corresponding to an application and/or web browser, and an original cursor. For example, interactive graphical user interface 400A can display an original cursor that is utilized by a user through corresponding inputs via a client interface prior to shadow program 110 generating a shadow cursor. In this example, original cursor 402 is displayed on interactive graphical user interface 400A. In another example, interactive graphical user interface 400A can display a GUI window corresponding to an application or web browser that contains one or more interactive graphical icons for a user. In this example, GUI window 404 is displayed on interactive graphical user interface 400A while containing two interactive graphical icons. In another example, interactive graphical user interface 400A can display one or more interactive graphical icons that a user can select that, when selected, will transition an application to a new state. In this example, interactive graphical icons 406A and 406B are displayed within GUI window 404 for selection by a user.

Figure 4B:
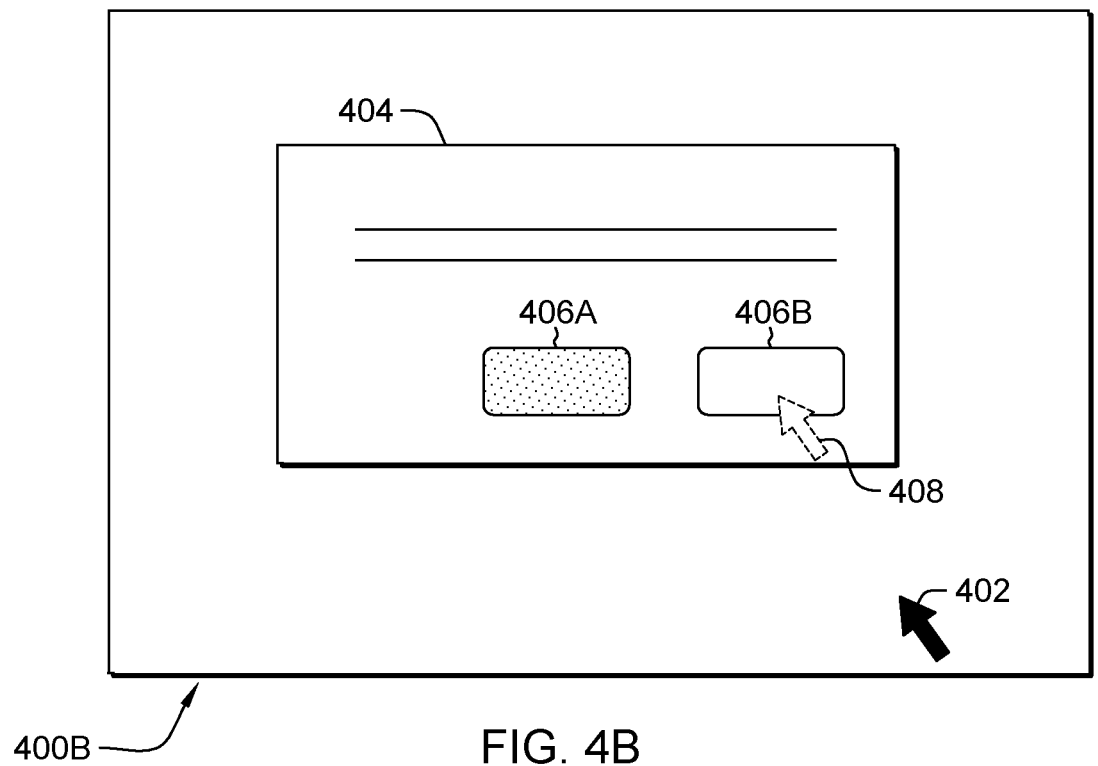
FIG. 4B is a screenshot example of an interactive graphical user interface demonstrating a shadow cursor generated at a location of a most probable action button, in accordance with an embodiment of the present invention.

FIG. 4B is a screenshot example of an interactive graphical user interface 400B demonstrating a shadow cursor generated at a location of a most probable action button, in accordance with an embodiment of the present invention.

In general, interactive graphical user interface 400B includes one or more interactive graphical icons, one or more GUI windows corresponding to an application and/or web browser, an original cursor, and a generated shadow cursor generated by shadow program 110. For example, interactive graphical user interface 400B can display an original cursor. In one embodiment, while a shadow cursor is generated and displayed by shadow program 110 on interactive graphical user interface 400B, the original cursor is also displayed, but is functionally disabled until a user input prompts shadow program 110 to remove the shadow cursor. In this example, original cursor 402 is displayed on interactive graphical user interface 400B. In another example, interactive graphical user interface 400B can display a GUI window corresponding to an application or web browser that contains one or more interactive graphical icons for a user. In this example, GUI window 404 is displayed on interactive graphical user interface 400B while containing two interactive graphical icons. In another example, interactive graphical user interface 400B can display one or more interactive graphical icons that a user can select that, when selected, will transition an application to a new state. In this example, interactive graphical icons 406A and 406B are displayed within GUI window 404 for selection by a user. In another example, interactive graphical user interface 400B can display a generated shadow cursor generated by shadow program 110, wherein the generated shadow cursor is at a location of an interactive graphical icon that is determined to be a most probable selection among a determined set of probable selections. In this example, generated shadow cursor 408 is generated at a location of interactive graphical icon 406B that shadow program 110 determined as a most probable selection between interactive graphical icon 406A and 406B.

Figure 4C:
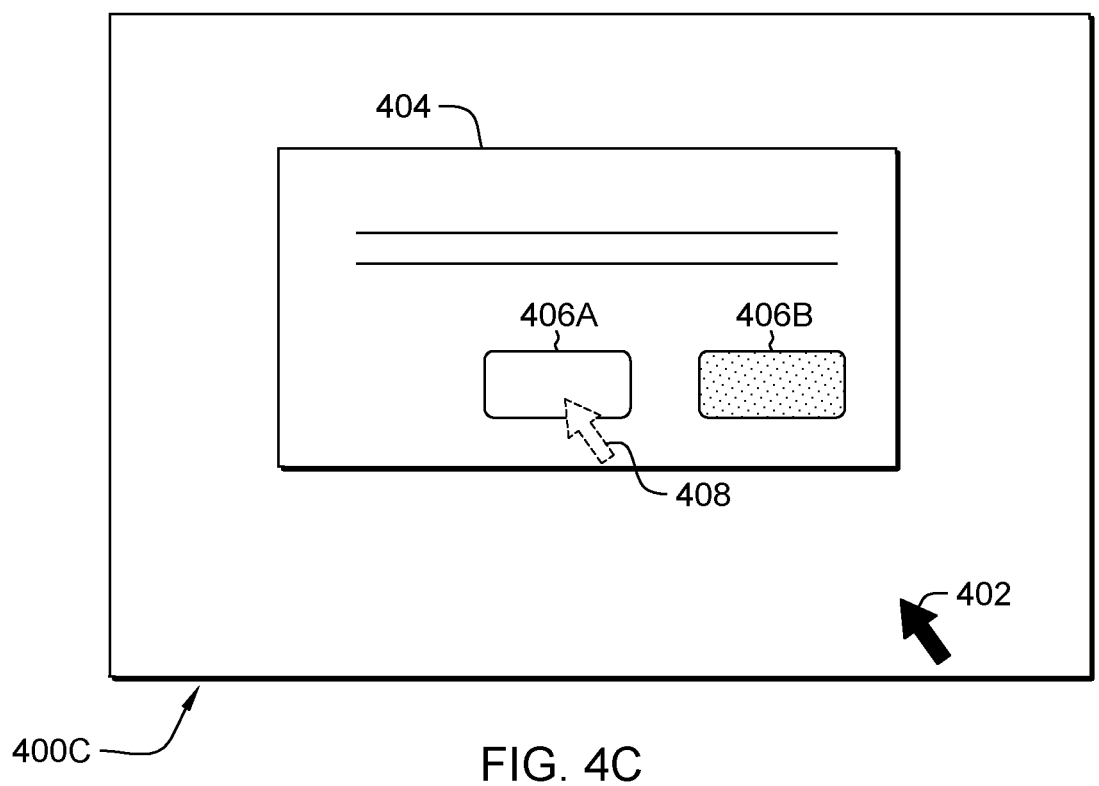
FIG. 4C is a screenshot example of an interactive graphical user interface demonstrating a shadow cursor shifted, in response to a user feedback, to a location of a next most probable action button, in accordance with an embodiment of the present invention.

FIG. 4C is a screenshot example of an interactive graphical user interface 400C demonstrating a shadow cursor shifted, in response to a user feedback, to a location of a next most probable action button, in accordance with an embodiment of the present invention.

In general, interactive graphical user interface 400C includes one or more interactive graphical icons, one or more GUI windows corresponding to an application and/or web browser, an original cursor, and a generated shadow cursor generated by shadow program 110. For example, interactive graphical user interface 400C can display an original cursor. In one embodiment, while a shadow cursor is generated and displayed by shadow program 110 on interactive graphical user interface 400C, the original cursor is also displayed, but is functionally disabled until a user input prompts shadow program 110 to remove the shadow cursor. In this example, original cursor 402 is displayed on interactive graphical user interface 400C. In another example, interactive graphical user interface 400C can display a GUI window corresponding to an application or web browser that contains one or more interactive graphical icons for a user. In this example, GUI window 404 is displayed on interactive graphical user interface 400C while containing two interactive graphical icons. In another example, interactive graphical user interface 400C can display one or more interactive graphical icons that a user can select that, when selected, will transition an application to a new state. In this example, interactive graphical icons 406A and 406B are displayed within GUI window 404 for selection by a user. In another example, interactive graphical user interface 400C can display a generated shadow cursor generated by shadow program 110, wherein the generated shadow cursor is shifted to a new location on interactive graphical user interface 400C in response to a user feedback. In this example, generated shadow cursor was generated at a location of interactive graphical icon 406B that shadow program 110 determined to be a most probable selection between interactive graphical icon 406A and 406B. The user entered an input (e.g., a "tab" key on a keyboard) that prompted shadow program 110 to shift generated shadow cursor 408 to a location of next probable selection. In response to receiving the input made by the user, shadow program 110 shifts generated shadow cursor 408 to interactive graphical icon 406A that shadow program 110 determined as the next most probable selection between interactive graphical icon 406A and 406B.

In an alternate example, generated shadow cursor was generated at a location of interactive graphical icon 406B that shadow program 110 determined to be a most probable selection between interactive graphical icon 406A and 406B. A user moves a mouse planarly to correspondingly move generated shadow cursor 408 to a location of interactive graphical icon 406A. Shadow program 110 receives mouse input from a user, and moves generated shadow cursor 408 respective to the input motions of the mouse made by the user, subsequently resulting in generated shadow cursor 408 being shifted to location of interactive graphical icon 406A.

Figure 4D:
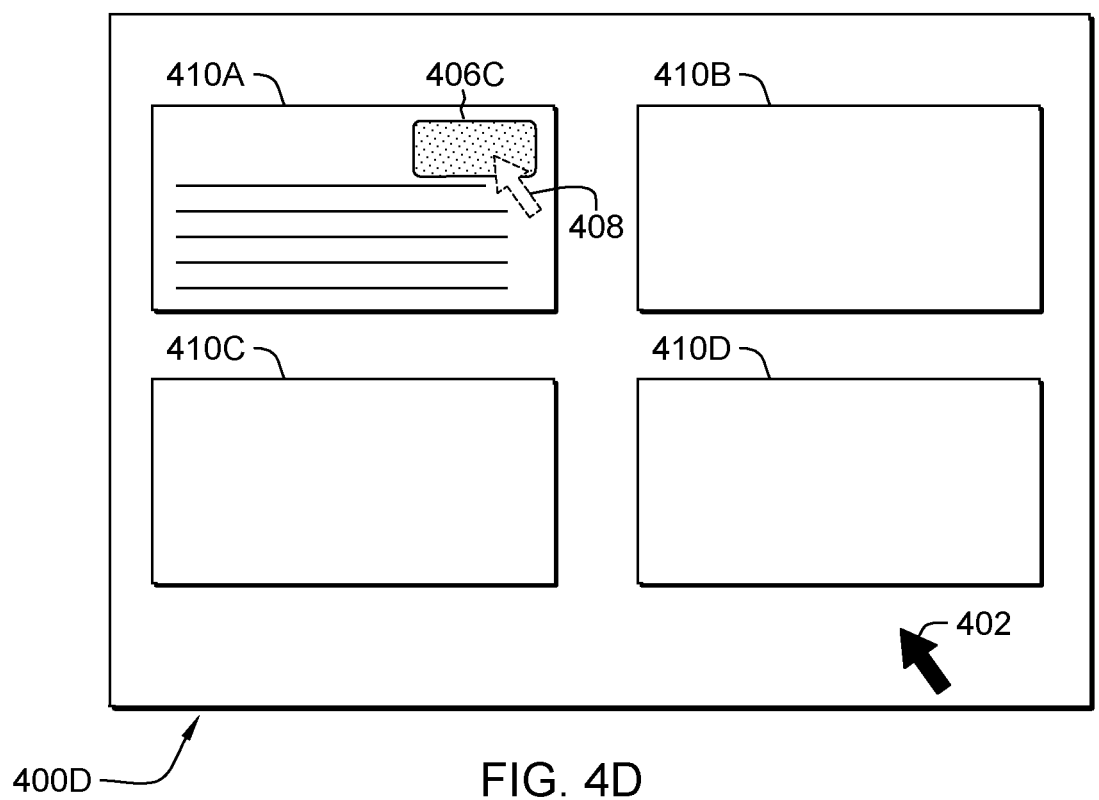
FIG. 4D is a screenshot example of a shadow cursor generated at a location of a most probable item for selection on an interactive graphical user interface, in accordance with an embodiment of the present invention.

FIG. 4D is a screenshot example of an interactive graphical user interface 400D demonstrating a shadow cursor generated at a location of a most probable item for selection, in accordance with an embodiment of the present invention.

In general, interactive graphical user interface 400D includes one or more interactive graphical icons, one or more GUI windows corresponding to an application and/or web browser, an original cursor, and a generated shadow cursor generated by shadow program 110. For example, interactive graphical user interface 400D can display an original cursor that is utilized by a user through corresponding inputs via a client interface prior to shadow program 110 generating a shadow cursor. In this example, original cursor 402 is displayed on interactive graphical user interface 400D. In another example, interactive graphical user interface 400D can display one or more GUI windows corresponding to an application or web browser that contains one or more interactive graphical icons for a user. In this example, GUI window 410A, 410B, 410C, and 410D are displayed on interactive graphical user interface 400D while containing one or more interactive graphical icons for selection by a user. In another example, interactive graphical user interface 400D can display one or more interactive graphical icons that a user can select that, when selected, will transition an application to a new state. In this example, interactive graphical icons 406C is displayed within GUI window 410A for selection by a user, and is an interactive graphical icon that is determined by shadow program 110 to be a most probable selection among a set of probable selections. In another example, interactive graphical user interface 400D can display a generated shadow cursor generated by shadow program 110, wherein the generated shadow cursor is at a location of an interactive graphical icon that is determined to be a most probable selection among a determined set of probable selections. In this example, generated shadow cursor 408 is generated at a location of interactive graphical icon 406C that shadow program 110 determined as a most probable selection.

Figure 5:
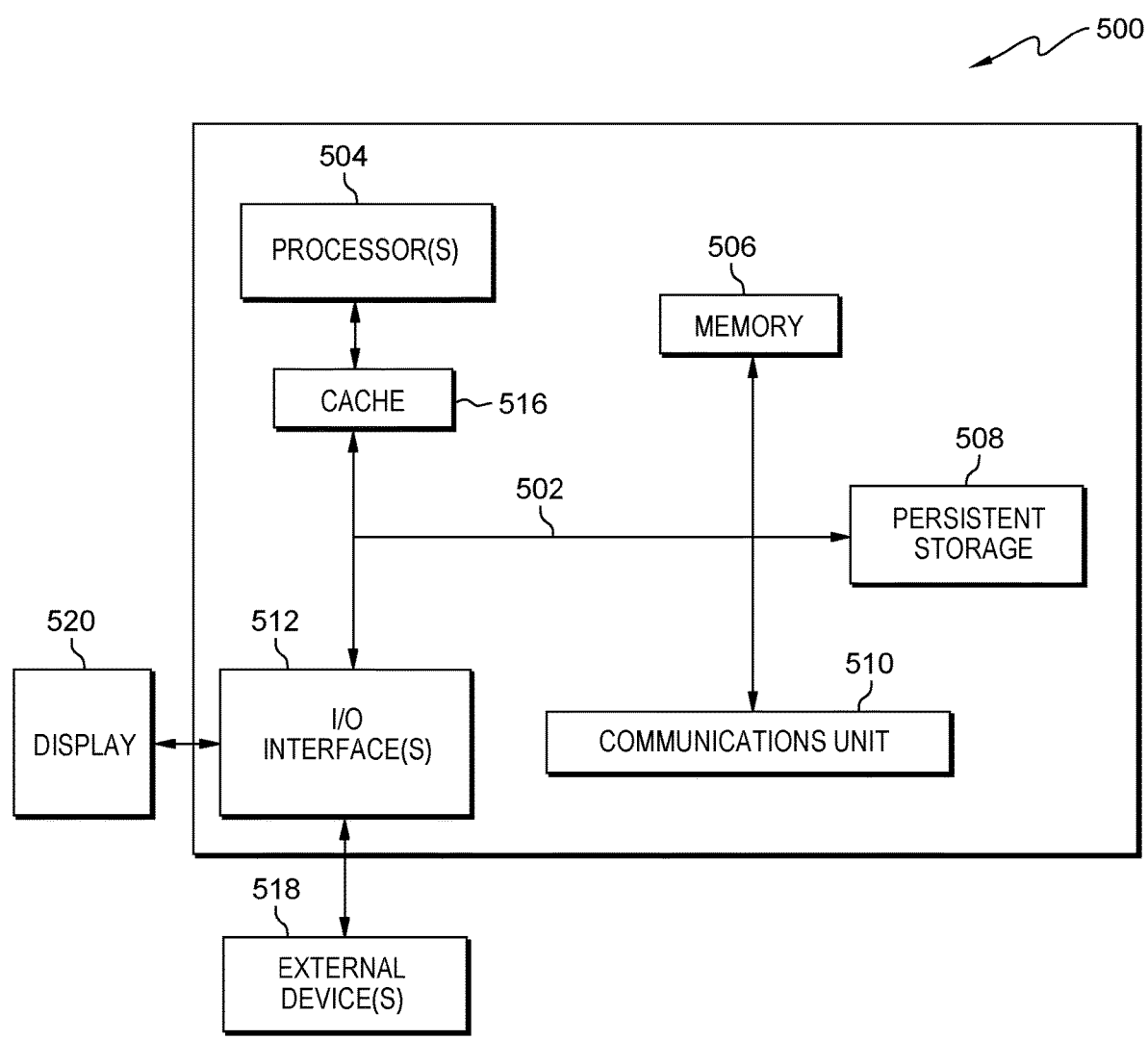
FIG. 5 depicts a block diagram of components of the computing systems of FIG. 1, in accordance with an embodiment of the present invention.

FIG. 5 depicts a block diagram of components of computing systems within shadow cursor environment 100 of FIG. 1, in accordance with an embodiment of the present invention. It should be appreciated that FIG. 5 provides only an illustration of one implementation and does not imply any limitations with regard to the environments in which different embodiments can be implemented. Many modifications to the depicted environment can be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Computer system 500 includes communications fabric 502, which provides communications between cache 516, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses or a crossbar switch.

Memory 506 and persistent storage 508 are computer readable storage media. In this embodiment, memory 506 includes random access memory (RAM). In general, memory 506 can include any suitable volatile or non-volatile computer readable storage media. Cache 516 is a fast memory that enhances the performance of computer processor(s) 504 by holding recently accessed data, and data near accessed data, from memory 506.

Shadow program 110 may be stored in persistent storage 508 and in memory 506 for execution by one or more of the respective computer processors 504 via cache 516. In an embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. Shadow program 110 may be downloaded to persistent storage 508 through communications unit 510.

I/O interface(s) 512 allows for input and output of data with other devices that may be connected to client computer 102 and/or server computer 108. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention, e.g., Shadow program 110, can be stored on such portable computer readable storage media and can be loaded onto persistent storage 508 via I/O interface(s) 512. I/O interface(s) 512 also connect to a display 520.

Display 520 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   accessing a user interface display, communicating with a computer, that includes a plurality of selection areas and an original cursor placed over one selection area of the plurality of selection areas;
   determining all possible states of an application;
   generating a transition graph by mapping a set of transition arcs to a set of states among the all possible states of the application by assigning a link and a corresponding abstract label to the link between pairs of states of the all possible states in response to corresponding inputs that determine the all possible states;
   collecting inputs made by a user for each state among the all possible states by logging a number of selections made by the user for each input of a set of possible inputs for each of the states of the possible states, and associating the logged number of selections for each of the inputs of the set of possible inputs to a corresponding transition arc associated with an input of the set of possible inputs;

determining a set of probabilities corresponding to the set of transition arcs based on the associated logged number of selections corresponding to each transition arc;

determining a current state of the application;

determining, based on the current state of the application and the set of probabilities associated with a set of transition arcs corresponding to the determined current state, a transition arc with the highest probability;

generating a shadow cursor for the user interface that displays over a selection area corresponding to the transition arc with the highest probability;

disabling the original cursor based on the generated shadow cursor and displaying of the generated shadow cursor;

determining, based on the current state of the application and the set of probabilities associated with a set of transition arcs corresponding to the determined current state, a transition arc with the next highest probability;

responsive to receiving a first user feedback based on the generated shadow cursor, shifting the generated shadow cursor to the selection area corresponding to the determined transition arc with the next highest probability; and responsive to receiving a second user feedback based on the generated shadow cursor, removing and disabling the shadow cursor from the user interface and returning the original cursor as the sole functioning cursor without activating the selection area.

2. The computer-implemented method of claim 1, wherein generating a shadow cursor for the user interface that displays over a selection area corresponding to the transition arc with the highest probability comprises:

determining a current application state based on a set of user inputs and the generated transition graph;

determining a set of probable selections based on the determined current application state;

tagging locations on the user interface that correspond to each probable selection of the set of probable selections;

ranking the set of probable selections in an order based on the determined current application state and corresponding transition arc probabilities of the generated transition graph; and overlaying a shadow cursor at the location on the user interface that corresponds to a most probable selection among the ranked set of probable selections.

3. The computer-implemented method of claim 1, wherein the second user feedback comprises an input corresponding to a gesture made by the user, wherein the gesture made by the user is an oscillation of an input device on a planar surface.

4. The computer-implemented method of claim 1, wherein the second user feedback comprises an input corresponding to a button input on an interface device, wherein the button input on the interface device is a predetermined button associated with providing user feedback.

5. The computer-implemented method of claim 1, wherein the first user feedback comprises of an input corresponding to a button input on an interface device, wherein the button input on the interface device is a predetermined button associated with providing user feedback.

6. The computer-implemented method of claim 1, wherein the generated shadow cursor is a cursor icon that is visibly differentiable from an original cursor in color, size, and shape.

7. The computer-implemented method of claim 1, wherein the generated transition graph is based on statistical selection habits of one or more users.

8. A computer program product comprising:

one or more computer readable storage media and program instructions stored on the one or more computer readable storage media, the program instructions comprising:

program instructions to access a user interface display, communicating with a computer, that includes a plurality of selection areas and an original cursor placed over one selection area of the plurality of selection areas;

program instructions to determine all possible states of an application;

program instructions to generate a transition graph by mapping a set of transition arcs to a set of states among the all possible states of the application by assigning a link and a corresponding abstract label to the link between pairs of states of the all possible states in response to corresponding inputs that determine the all possible states;

program instructions to collect inputs made by a user for each state among the all possible states by logging a number of selections made by the user for each input of a set of possible inputs for each of the states of the possible states, and associating the logged number of selections for each of the inputs of the set of possible inputs to a corresponding transition arc associated with an input of the set of possible inputs;

program instructions to determine a set of probabilities corresponding to the set of transition arcs based on the associated logged number of selections corresponding to each transition arc;

program instructions to determine a current state of the application;

program instructions to determine, based on the current state of the application and the set of probabilities associated with a set of transition arcs corresponding to the determined current state, a transition arc with the highest probability;

program instructions to generate a shadow cursor for the user interface that displays over a selection area corresponding to the transition arc with the highest probability;

program instructions to disable the original cursor based on the generated shadow cursor and display the generated shadow cursor;

program instructions to determine, based on the current state of the application and the set of probabilities associated with a set of transition arcs corresponding to the determined current state, a transition arc with the next highest probability;

program instructions to, responsive to receiving a first user feedback based on the generated shadow cursor, shift the generated shadow cursor to the selection area corresponding to the determined transition arc with the next highest probability; and program instructions to, responsive to receiving a second user feedback based on the generated shadow cursor, remove and disable the shadow cursor from the user interface and return the original cursor as the sole functioning cursor without activating the selection area.

9. The computer program product of claim 8, wherein the program instructions to generate a shadow cursor for the user interface that displays over a selection area corresponding to the transition arc with the highest probability comprise:
- program instructions to determine a current application state based on a set of user inputs and the generated transition graph;
- program instructions to determine a set of probable selections based on the determined current application state;
- program instructions to tag locations on the user interface that correspond to each probable selection of the set of probable selections;
- program instructions to rank the set of probable selections in an order based on the determined current application state and corresponding transition arc probabilities of the generated transition graph; and
- program instructions to overlay a shadow cursor at the location on the user interface that corresponds to a most probable selection among the ranked set of probable selections.

10. The computer program product of claim 8, wherein the second user feedback comprises an input corresponding to a gesture made by the user, wherein the gesture made by the user is an oscillation of an input device on a planar surface.

11. The computer program product of claim 8, wherein the second user feedback comprises an input corresponding to a button input on an interface device, wherein the button input on the interface device is a predetermined button associated with providing user feedback.

12. The computer program product of claim 8, wherein the first user feedback comprises an input corresponding to a button input on an interface device, wherein the button input on the interface device is a predetermined button associated with providing user feedback.

13. A computer program product comprising:
- one or more processors;
- one or more computer readable storage media; and
- program instructions stored on the one or more computer readable storage media for execution by at least one of the one or more processors, the program instructions comprising:
  - program instructions to access a user interface display, communicating with a computer, that includes a plurality of selection areas and an original cursor placed over one selection area of the plurality of selection areas;
  - program instructions to determine all possible states of an application;
  - program instructions to generate a transition graph by mapping a set of transition arcs to a set of states among the all possible states of the application by assigning a link and a corresponding abstract label to the link between pairs of states of the all possible states in response to corresponding inputs that determine the all possible states;
  - program instructions to collect inputs made by a user for each state among the all possible states by logging a number of selections made by the user for each input of a set of possible inputs for each of the states of the possible states, and associating the logged number of selections for each of the inputs of the set of possible inputs to a corresponding transition arc associated with an input of the set of possible inputs;
  - program instructions to determine a set of probabilities corresponding to the set of transition arcs based on the associated logged number of selections corresponding to each transition arc;
  - program instructions to determine a current state of the application;
  - program instructions to determine, based on the current state of the application and the set of probabilities associated with a set of transition arcs corresponding to the determined current state, a transition arc with the highest probability;
  - program instructions to generate a shadow cursor for the user interface that displays over a selection area corresponding to the transition arc with the highest probability;
  - program instructions to disable the original cursor based on the generated shadow cursor and display the generated shadow cursor;
  - program instructions to determine, based on the current state of the application and the set of probabilities associated with a set of transition arcs corresponding to the determined current state, a transition arc with the next highest probability;
  - program instructions to, responsive to receiving a first user feedback based on the generated shadow cursor, shift the generated shadow cursor to the selection area corresponding to the determined transition arc with the next highest probability; and
  - program instructions to, responsive to receiving a second user feedback based on the generated shadow cursor, remove and disable the shadow cursor from the user interface and return the original cursor as the sole functioning cursor without activating the selection area.

14. The computer system of claim 13, wherein the program instructions to generate a shadow cursor for the user interface that displays over a selection area corresponding to the transition arc with the highest probability comprise:
- program instructions to determine a current application state based on a set of user inputs and the generated transition graph;
- program instructions to determine a set of probable selections based on the determined current application state;
- program instructions to tag locations on the user interface that correspond to each probable selection of the set of probable selections;
- program instructions to rank the set of probable selections in an order based on the determined current application state and corresponding transition arc probabilities of the generated transition graph; and
- program instructions to overlay a shadow cursor at the location on the user interface that corresponds to a most probable selection among the ranked set of probable selections.

* * * * *